United States Patent
Henry et al.

(10) Patent No.: US 11,980,112 B2
(45) Date of Patent: May 14, 2024

(54) SYSTEM AND METHOD FOR CONTROLLING THE OPERATION OF A TILLAGE IMPLEMENT BASED ON CROP ROW LOCATION

(71) Applicant: CNH Industrial Canada, Ltd., Saskatoon (CA)

(72) Inventors: James W. Henry, Saskatoon (CA); Nicholas Nahuel Andrejuk, Normal, IL (US); Joshua David Harmon, Leola, PA (US)

(73) Assignee: CNH Industrial Canada, Ltd. (CA)

( * ) Notice: Subject to any disclaimer, the term of this patent is extended or adjusted under 35 U.S.C. 154(b) by 552 days.

(21) Appl. No.: 16/687,238

(22) Filed: Nov. 18, 2019

(65) Prior Publication Data
US 2021/0144900 A1    May 20, 2021

(51) Int. Cl.
| | |
|---|---|
| *A01B 63/24* | (2006.01) |
| *A01B 39/04* | (2006.01) |
| *A01B 49/02* | (2006.01) |
| *A01B 79/00* | (2006.01) |

(52) U.S. Cl.
CPC ............ *A01B 63/245* (2013.01); *A01B 39/04* (2013.01); *A01B 79/005* (2013.01); *A01B 49/027* (2013.01)

(58) Field of Classification Search
CPC ..... A01B 63/245; A01B 39/04; A01B 79/005; A01B 49/027
See application file for complete search history.

(56) References Cited

U.S. PATENT DOCUMENTS

| | | | | |
|---|---|---|---|---|
| 4,918,441 A | * | 4/1990 | Bohman | A01D 41/1278 340/901 |
| 5,410,479 A | * | 4/1995 | Coker | G05D 1/0255 340/901 |
| 5,970,695 A | * | 10/1999 | Dunn | A01B 73/005 172/311 |

(Continued)

FOREIGN PATENT DOCUMENTS

| | | |
|---|---|---|
| DE | 10349321 | 5/2005 |
| DE | 102011051827 | 1/2013 |

OTHER PUBLICATIONS

Tractorspotter. "Hemp Harvest | Hempflax | John Deere t660i Double Cut Combine | for CBD Oil." YouTube, YouTube, Sep. 3, 2019, https://www.youtube.com/watch?v=_AKUCvqppy8. (Year: 2019).*

(Continued)

*Primary Examiner* — Tara Mayo
(74) *Attorney, Agent, or Firm* — Rebecca L. Henkel; Peter K. Zacharias; Rickard K. DeMille

(57) ABSTRACT

In one aspect, a system for controlling an operation of a tillage implement being towed across a field by a work vehicle may include a tillage tool configured to engage soil and crop material present within a field as the tillage implement is being towed across the field by the work vehicle. Furthermore, the system may include a controller configured to receive an input associated with crop material present within the field and determine a location of a crop row relative to the tillage tool based on the received input. Additionally, the controller may be configured to control a direction of travel of the tillage implement based on the determined location of the crop row.

20 Claims, 6 Drawing Sheets

(56) References Cited

U.S. PATENT DOCUMENTS

| | | | | |
|---|---|---|---|---|
| 6,144,910 | A | * | 11/2000 | Scarlett et al. ...... A01B 63/023 701/50 |
| 9,026,321 | B2 | | 5/2015 | Henry et al. |
| 9,030,549 | B2 | | 5/2015 | Redden |
| 9,226,449 | B2 | | 1/2016 | Bischoff |
| 9,232,687 | B2 | | 1/2016 | Bassett |
| 9,282,688 | B2 | | 3/2016 | Casper et al. |
| 9,516,802 | B2 | | 12/2016 | Zemenchik |
| 10,123,475 | B2 | | 11/2018 | Posselius et al. |
| 10,130,039 | B2 | | 11/2018 | Mahieu et al. |
| 10,165,725 | B2 | | 1/2019 | Sugumaran et al. |
| 2002/0106108 | A1 | * | 8/2002 | Benson et al. ......... G01C 11/00 382/104 |
| 2012/0185138 | A1 | * | 7/2012 | Prickel et al. ....... A01B 69/004 701/50 |
| 2017/0112043 | A1 | | 4/2017 | Nair et al. |
| 2017/0112044 | A1 | * | 4/2017 | Stratton et al. ...... G05D 1/0219 |
| 2017/0354079 | A1 | * | 12/2017 | Foster et al. ......... A01B 69/008 |
| 2018/0206393 | A1 | | 7/2018 | Stoller et al. |
| 2018/0220577 | A1 | * | 8/2018 | Posselius et al. .... A01B 79/005 |
| 2018/0310474 | A1 | | 11/2018 | Posselius et al. |
| 2018/0336410 | A1 | | 11/2018 | Posselius |
| 2019/0021226 | A1 | | 1/2019 | Dima et al. |

OTHER PUBLICATIONS

"Greensill Farming—Sugar Cane Harvesting 2019 (Ft, John Deere CH570 & Ace Haulouts)." YouTube, YouTube, Jul. 20, 2019, https://www.youtube.com/watch?v=CVMVB9r9c_I. (Year: 2019).*

Scott, Jessie, "Dynamically Adjustable Tillage System From Gates Manufacturing," Successful Farming, Jun. 16, 2015.

* cited by examiner

SYSTEM AND METHOD FOR CONTROLLING THE OPERATION OF A TILLAGE IMPLEMENT BASED ON CROP ROW LOCATION

FIELD OF THE INVENTION

The present disclosure generally relates to tillage implements and, more particularly, to systems and methods for controlling the operation of a tillage implement based on the location(s) of one or more crops rows within the field.

BACKGROUND OF THE INVENTION

It is well known that, to attain the best agricultural performance from a piece of land, a farmer must cultivate the soil, typically through one or more tillage operations. Common tillage operations include plowing, harrowing, and sub-soiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing a tillage operation, it is generally desirable to knock down any stubble and/or break up any large root balls present within the field to form a proper seedbed for subsequent planting operations. As such, it may be necessary to position the tools (e.g., shanks) mounted on the tillage implement at a specific location or orientation relative to the crop rows within the field to allow the tools to engage the stubble and/or root balls. However, it may be difficult for the operator to control the operation of the tillage implement such that the tillage implement is properly positioned/oriented relative to the crop rows.

Accordingly, an improved system and method for controlling the operation of a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling an operation of a tillage implement being towed across a field by a work vehicle. The system may include a tillage tool configured to engage soil and crop material present within a field as the tillage implement is being towed across the field by the work vehicle. Furthermore, the system may include a controller configured to receive an input associated with crop material present within the field and determine a location of a crop row relative to the tillage tool based on the received input. Additionally, the controller may be configured to control a direction of travel of the tillage implement based on the determined location of the crop row.

In another aspect, the present subject matter is directed to a method for controlling an operation of a tillage implement. The tillage implement may include a tillage tool configured to engage soil and crop material present within a field as the tillage implement is being towed across the field by a work vehicle. The method may include receiving, with one or more computing devices, an input associated with the crop material present within the field. Furthermore, the method may include determining, with the one or more computing devices, a location of a crop row within the field relative to the tillage tool based on the received input. Additionally, the method may include controlling, with the one or more computing devices, a direction of travel of the tillage implement based on the determined location of the crop row.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
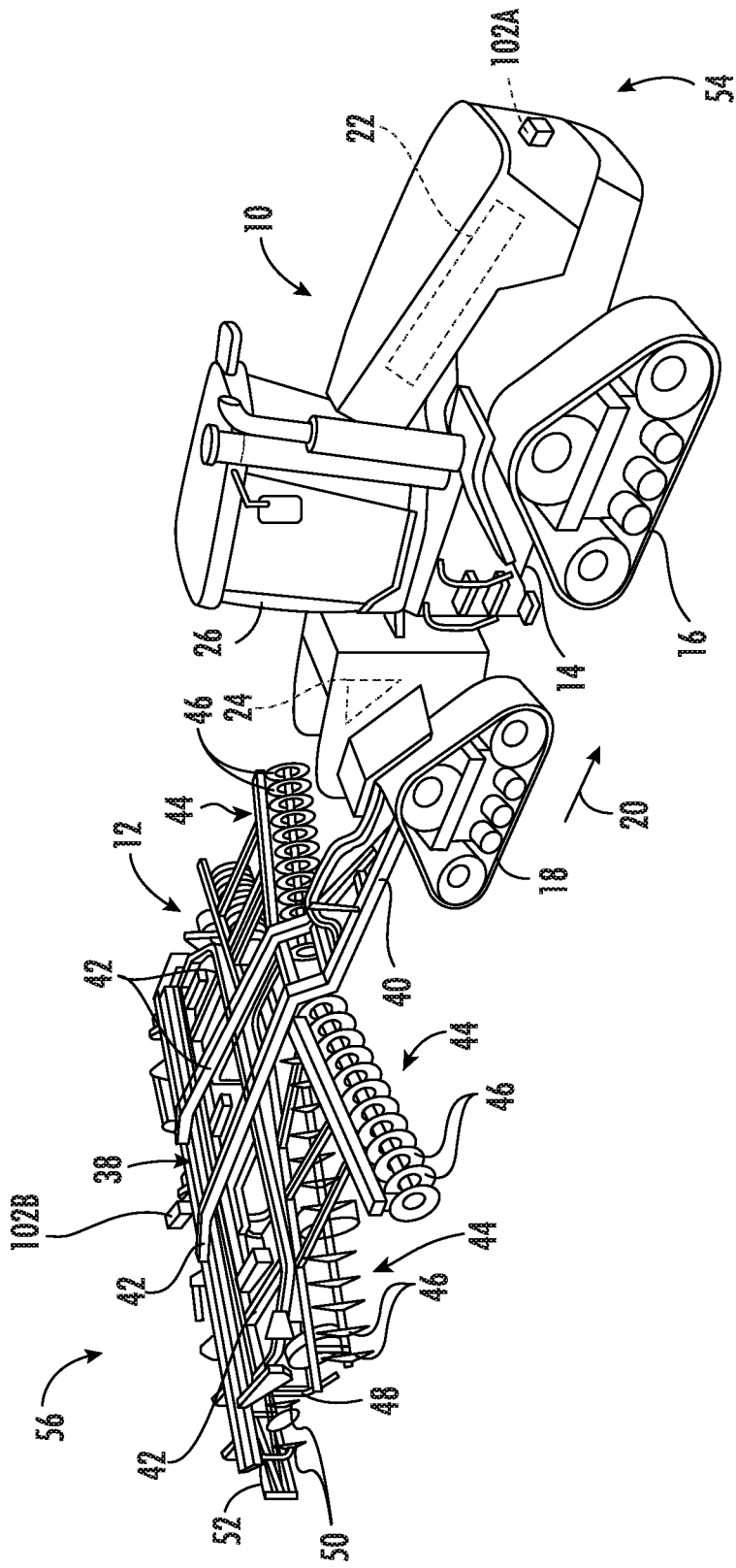
FIG. 1 illustrates a perspective view of one embodiment of a work vehicle towing an implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling an operation of a tillage implement. Specifically, in several embodiments, as the tillage implement is towed across a field to perform a tillage operation thereon, a controller of the disclosed system may be configured to receive one or more inputs associated with the crop material present within the field. For example, in one embodiment, the controller may be configured to receive data indicative of the crop material present within the field from one or more crop material sensors (e.g., a LIDAR sensor(s)) installed on the tillage implement or an associated work vehicle. Thereafter, the controller may be configured to determine the location(s) of one or more crop rows within the field relative to one or more tillage tools (e.g., a shank(s)) of the tillage implement based on the received input(s). For instance, the controller may be configured to analyze the received sensor data to identify aligned and evenly spaced apart crop material elements, such as stubble and/or root balls, present within the field. Such aligned and spaced apart crop material elements may, in turn, be indicative of the presence of crop rows. Alternatively, the controller may be configured to determine the location(s) of the crop row(s) within the field based on a field map generated during a previous agricultural operation (e.g., the previous planting operation).

In accordance with aspects of the present subject matter, the controller may be configured to control the direction of travel of the tillage implement based on the determined location(s) of the crop row(s). For example, in one embodiment, the controller may be configured to determine the lateral distance(s) between the crop row(s) and the tillage tool(s). In such an embodiment, when the determined lateral distance(s) exceeds a predetermined maximum lateral distance value, the controller may be configured to control the operation of one or more steering device(s) of the work vehicle to adjust the direction of travel of the tillage implement. In another embodiment, the controller may be configured to determine the angle(s) of the crop row(s) relative to the direction of travel of the tillage implement. Thereafter, when the determined angle(s) falls outside of a predetermined angle range, the controller may be configured to control the operation of a steering device(s) to adjust the direction of travel of the tillage implement.

Thus, the disclosed systems and methods enable the tools of a tillage implement to be more accurately aligned with stubble, root balls, and/or other unprocessed crop material within the field. This, in turn, allows for more precise positioning of the tillage implement within the field, thereby providing improved seedbed quality and superior agricultural outcomes.

Figure 2:
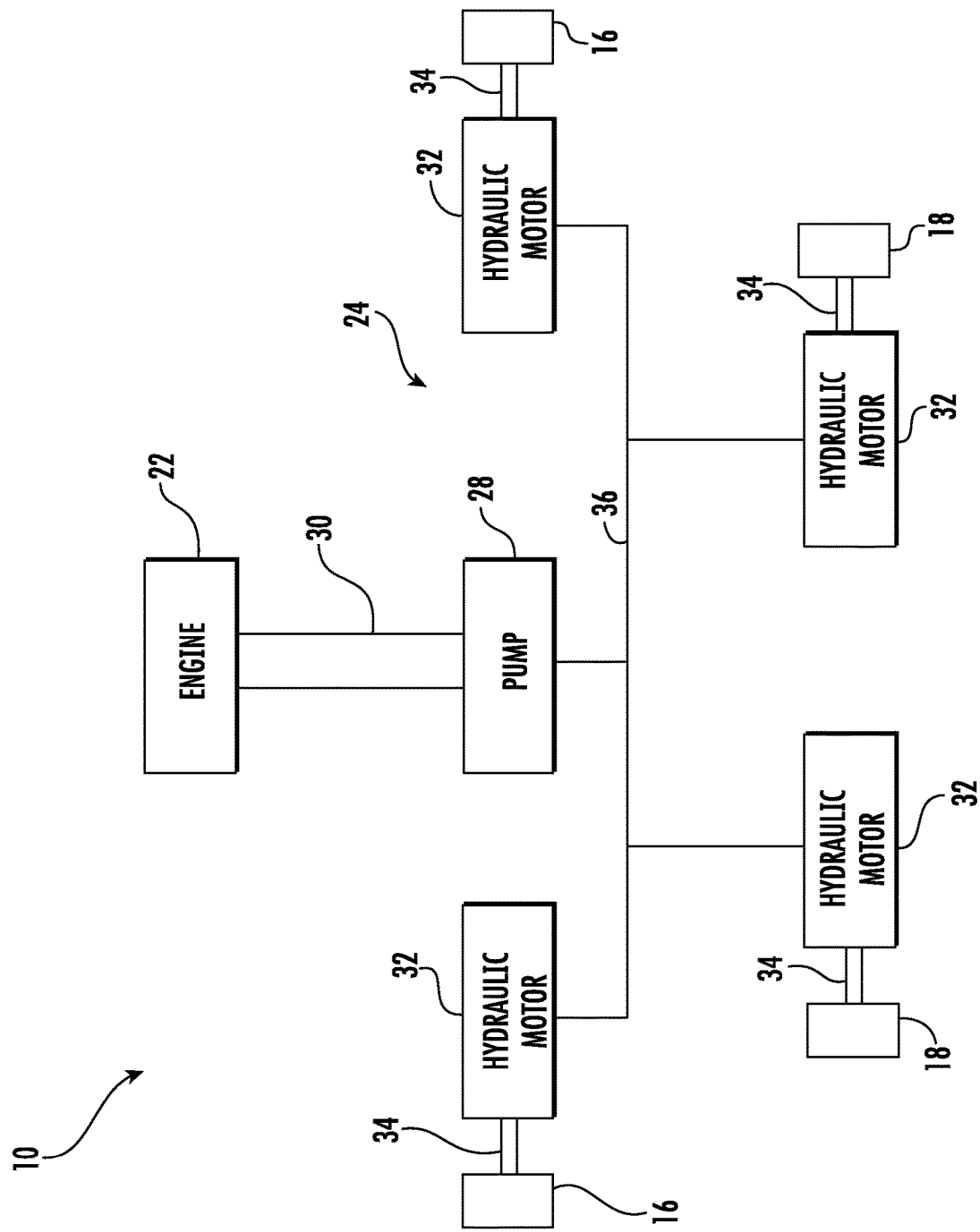
FIG. 2 illustrates a schematic view of various components of the work vehicle shown in FIG. 1, particularly illustrating a transmission of the work vehicle.

Referring now to drawings, FIGS. 1 and 2 illustrate various views of one embodiment of a work vehicle 10 and an associated tillage implement 12 in accordance with aspects of the present subject matter. Specifically, FIG. 1 illustrates a perspective view of the work vehicle 10 towing the tillage implement 12 (e.g., across a field). Additionally, FIG. 2 illustrates a schematic view of the work vehicle 10 shown in FIG. 1. As shown, in the illustrated embodiment, the work vehicle 10 is configured as an agricultural tractor and the tillage implement 12 is configured as a disk ripper. However, in other embodiments, the work vehicle 10 may be configured as any other suitable agricultural vehicle. Furthermore, in alternative embodiments, the tillage implement 12 may be configured as any other suitable tillage implement.

As shown in FIGS. 1 and 2, the work vehicle 10 may include a frame or chassis 14 configured to support or couple to a plurality of components. For example, a pair of front track assemblies 16 (one is shown) and a pair of rear track assemblies 18 (one is shown) may be coupled to the frame 14. The track assemblies 16, 18 may be configured to support the work vehicle 10 relative to the ground and move the work vehicle 10 in a direction of travel (e.g., as indicated by arrow 20 in FIG. 1) across a field. In this regard, the work vehicle 10 may include an engine 22 and a transmission 24 configured to transmit power from the engine 22 to the track assemblies 16, 18. Furthermore, an operator's cab 26 may be supported by a portion of the chassis 14 and may house various input devices (e.g., a user interface) for permitting an operator to control the operation of one or more components of the work vehicle 10 and/or one or more components of the tillage implement 12.

As shown in FIG. 2, in several embodiments, the transmission 24 may be configured as a hydrostatic transmission. Specifically, in such embodiments, the transmission 24 may include a pump 28 configured to be rotationally driven by the engine 22, such as via a driveshaft 30. The transmission 22 may also include a plurality of hydraulic motors 32, with each motor 32 configured to rotationally drive one of the track assemblies 16, 18 (e.g., via an associated axle segment 34). Moreover, the transmission 22 may include a hydrostatic circuit 36 that fluidly couples the pump 28 to the hydraulic motors 32. In this respect, the engine 22 may rotationally drive the driveshaft 30 (e.g., by combusting a mixture of air and fuel). The driveshaft 30 may, in turn, rotationally drive the pump 28 in a manner that generates a pressurized flow of a fluid (e.g., hydraulic oil) within the hydrostatic circuit 36. As such, the hydrostatic circuit 36 may deliver the pressurized fluid flow to the hydraulic motors 32, thereby rotationally driving the hydraulic motors 32 and the associated track assemblies 16, 18. As will be described below, one or more valves (nor shown) may be provided in association with the hydrostatic circuit 36 to adjust the fluid flow through the hydrostatic circuit 36, thereby allowing the vehicle 10 to change its direction of travel 20. However, in alternative embodiments, the transmission 24 may be configured as any other suitable type of transmission.

Additionally, as shown in FIG. 1, the tillage implement 12 may generally include a frame 38 configured to be towed by the vehicle 10 via a pull hitch or tow bar 40 in the direction of travel 20. In general, the frame 38 may include a plurality of structural frame members 42, such as beams, bars, and/or the like, configured to support or couple to a plurality of components. As such, the frame 38 may be configured to support a plurality of tillage tools, such as a plurality of shanks, disk blades, leveling blades, basket assemblies, tines, spikes, and/or the like. In general, the various tillage tools may be configured to engage the soil and/or the crop material (e.g., stubble and/or root balls) present within the field, thereby performing a tillage operation on the field across which the tillage implement 12 is being towed. For example, in the illustrated embodiment, the frame 38 is configured to support various gangs 44 of disc blades 46, a plurality of ground-engaging shanks 48, a plurality of leveling blades 50, and a plurality of crumbler wheels or basket assemblies 52. However, in alternative embodiments, the frame 38 may be configured to support any other tillage tool(s) or combinations of tillage tools.

It should be further appreciated that the configuration of the work vehicle 10 and the tillage implement 12 described above and shown in FIGS. 1 and 2 is provided only to place the present subject matter in an exemplary field of use. Thus, it should be appreciated that the present subject matter may be readily adaptable to any manner of vehicle configuration and/or tillage implement configuration.

Additionally, in accordance with aspects of the present subject matter, the vehicle/implement 10/12 may include one or more crop material sensors coupled thereto and/or mounted thereon. In general, each crop material sensor may be configured to capture data associated with a portion of the field across which the vehicle/implement 10/12 is traveling. The captured data may, in turn, be indicative of the crop material present on the surface of the field. For example, such crop material may include unprocessed crop material, such as stubble, root balls, and/or the like, as well as processed crop material, such as chopped up leaves/stalks and/or the like. As will be described below, a controller(s) may be configured to receive and process the captured data to identify the location(s) of one or more crop rows within the field. In several embodiments, the crop material sensor(s) may be provided in operative association with the vehicle/implement 10/12 such that the sensor(s) has an associated field(s) of view or sensor detection range(s) directed towards a portion(s) of the field adjacent to the vehicle/implement 10/12. For example, as shown in FIG. 1, in one embodiment, one crop material sensor 102A may be mounted on a forward end 54 of the work vehicle 10 to capture data associated with a section of the field disposed in front of the vehicle 10 relative to the direction of travel 20. Similarly, as shown in FIG. 1, a second crop material sensor 102B may be mounted on an aft end 56 of the tillage implement 12 to capture crop material data associated with a section of the field disposed behind the tillage implement 12 relative to the direction of travel 20. However, in alternative embodiments, the crop material sensors 102A, 102B may be installed at any other suitable location(s) on the vehicle/implement 10/12. Additionally, in some embodiments, the vehicle/implement 10/12 may include only one crop material sensor or three or more crop material sensors.

Figure 3:
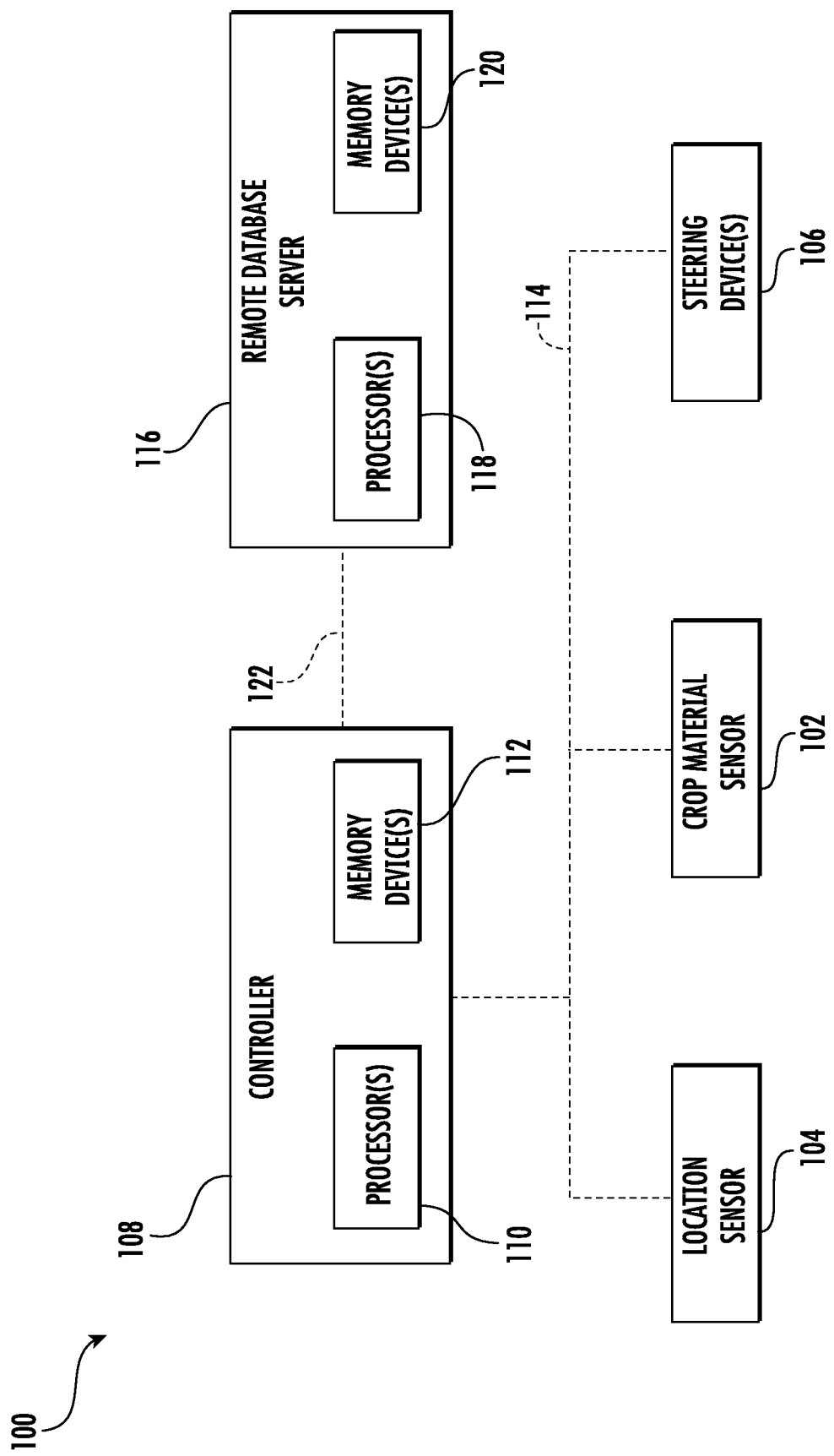
FIG. 3 illustrates a schematic view of one embodiment of a system for controlling the operation of a tillage implement in accordance with aspects of the present subject matter.

Referring now to FIG. 3, a schematic view of one embodiment of a system 100 for controlling the operation of a tillage implement is illustrated in accordance with aspects of the present subject matter. In general, the system 100 will be described herein with reference to the work vehicle 10 and the tillage implement 12 described above with reference to FIGS. 1 and 2. However, it should be appreciated by those of ordinary skill in the art that the disclosed system 100 may generally be utilized with work vehicles having any other suitable vehicle configuration and/or tillage implements having any other suitable implement configuration.

As shown in FIG. 3, the system 100 may include one or more crop material sensor(s) 102 coupled to or otherwise mounted on the vehicle/implement 10/12. In general, the crop material sensor(s) 102 may correspond to any suitable device(s) configured to capture data of the soil surface of the field that allows the crop material present on the top surface of the field to be identified. For instance, in several embodiments, the crop material sensor(s) 102 may correspond to a Light Detection and Ranging ("LIDAR") sensor(s), such as a LIDAR scanner(s). In such embodiments, the crop material sensor(s) 102 may be configured to output light pulses from a light source (e.g., a laser outputting a pulsed laser beam) and detect the reflection of each pulse off the soil surface. Based on the time of flight of the light pulses, the specific location (e.g., 2-D or 3-D coordinates) of the soil surface relative to the crop material sensor(s) 102 may be calculated. By scanning the pulsed light over a given swath width, the crop material present on the soil surface may be detected across a given section of the field. Thus, by continuously scanning the pulsed light along the soil surface as the work vehicle 10 and the tillage implement 12 are moved across the field, a plurality of data point scan lines may be generated that includes crop material data for all or a portion of the field. Alternatively, the crop material sensor(s) 102 may correspond to any other suitable device(s) capable of capturing data that allows the crop material present on the soil surface of the field to be identified. For example, in alternative embodiments, the crop material sensor(s) 102 may correspond to a camera(s), a Radio Detection and Ranging ("RADAR") sensor(s), and/or the like.

Moreover, the system 100 may include a location sensor 104 provided in operative association with the vehicle 10 and/or the tillage implement 12. In general, the location sensor 104 may be configured to determine the current location of the vehicle 10 and/or the tillage implement 12 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 104 may be transmitted to a controller(s) of the vehicle 10 and/or the tillage implement 12 (e.g., in the form coordinates) and stored within the controller's memory for subsequent processing and/or analysis. For instance, based on the known dimensional configuration and/or relative positioning between the vehicle 10 and the tillage implement 12, the determined location from the location sensor 104 may be used to geo-locate the tillage implement 12 within the field.

Furthermore, the system 100 may include one or more steering devices 106 of the work vehicle 10. In general, the steering device(s) 106 may be configured to adjust the direction of travel 20 of the work vehicle 10 such that the vehicle 10 is able to execute a turn. As mentioned above, in several embodiments, the work vehicle 10 may include a hydrostatic transmission 24. In such embodiments, the steering device(s) 106 may be configured as one or more valves provided in operative association with the hydrostatic circuit 36 of the transmission 24. Such valve(s) may, in turn, control the portion of the pressurized fluid flow directed to each hydraulic motor 32. For example, when the vehicle 10 is making a right turn, the valve(s) may direct more pressurized fluid flow to the hydraulic motors 32 powering the track assemblies 16, 18 on the left side of the vehicle. This, in turn, may cause the left side track assemblies 16, 18 to rotate faster than the right side track assemblies 16, 18, thereby causing the vehicle 10 to turn right. However, in alternative embodiments, the steering device(s) 106 may be configured as any other suitable device(s) for adjusting the direction of travel 20 of the vehicle 10. For example, in an embodiment in which the vehicle 10 is configured as a wheeled vehicle, the steering device(s) 106 may be configured as an electric motor, a linear actuator, a hydraulic cylinder, a pneumatic cylinder, or any other suitable actuator coupled to suitable mechanical assembly, such as a rack and pinion or a worm gear assembly, for adjusting the orientation of the wheels relative to the vehicle frame.

In accordance with aspects of the present subject matter, the system 100 may include a controller 108 positioned on and/or within or otherwise associated with the vehicle 10 and/or the tillage implement 12. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 112 may generally be configured to store suitable computer-readable instructions that, when implemented by the processor(s) 110, configure the controller 108 to perform various computer-implemented functions.

In addition, the controller 108 may also include various other suitable components, such as a communications circuit or module, a network interface, one or more input/output channels, a data/control bus and/or the like, to allow controller 108 to be communicatively coupled to any of the various other system components described herein (e.g., the crop material sensor(s) 102, the location sensor 104, and/or the steering device(s) 106). For instance, as shown in FIG. 3, a communicative link or interface 114 (e.g., a data bus) may be provided between the controller 108 and the components 102, 104, 106 to allow the controller 108 to communicate with the components 102, 104, 106 via any suitable communications protocol (e.g., CANBUS).

It should be appreciated that the controller 108 may correspond to an existing controller(s) of the vehicle 10 and/or the tillage implement 12, itself, or the controller 108 may correspond to a separate processing device. For instance, in one embodiment, the controller 108 may form all or part of a separate plug-in module that may be installed in association with the vehicle 10 and/or the tillage implement 12 to allow for the disclosed systems to be implemented without requiring additional software to be uploaded onto existing control devices of the vehicle 10 and/or the tillage implement 12. It should also be appreciated that the functions of the controller 108 may be performed by a single processor-based device or may be distributed across any number of processor-based devices, in which instance such devices may be considered to form part of the controller 108. For instance, the functions of the controller 108 may be distributed across multiple application-specific controllers, such as an engine controller, a transmission controller, an implement controller, and/or the like.

Moreover, the system 100 may include a remote database server 116 configured to store data associated with the location(s) of one or more crop rows present within the field across which the vehicle/implement 10/12 is traveling (e.g., a field map generated during the most recent planting operation). In general, the remote database server 116 may comprise any suitable processor-based device known in the art, such as a computing device or any suitable combination of computing devices. Thus, in several embodiments, the remote database server 116 may include one or more processor(s) 118 and associated memory device(s) 120 configured to perform a variety of computer-implemented database server functions. Such memory device(s) 120 may generally be configured to store suitable computer-readable instructions that, when implemented by the processor(s) 118, configure the remote database server 116 to perform various computer-implemented database server functions.

Furthermore, the remote database server 116 may also include various other suitable components, such as a communications circuit or module, a network interface, one or more input/output channels, a data/control bus and/or the like, to allow remote database server 116 to be communicatively coupled to the controller 108. For instance, as shown in FIG. 3, a communicative link or interface 122 (e.g., a data bus) may be provided between the remote database server 116 and the controller 108 to allow the remote database server 116 and the controller 108 to communicate via any suitable communications protocol (e.g., Wi-Fi, 3G, 4G, LTE, and/or the like).

Additionally, it should be appreciated that the remote database server 116 may located at any suitable location that is remote or otherwise spaced apart from the vehicle 10 and the tillage implement 12. For example, in one embodiment, the remote database server 116 may be located at a farm management office or facility. However, in alternative embodiments, the remote database server 116 may be located at any other suitable location.

In several embodiments, the controller 108 may be configured to receive one or more inputs associated with the crop material present within the field. More specifically, in one embodiment, the controller 108 may be configured to receive the input(s) as the vehicle/implement 10/12 travels across the field to perform a tillage operation thereon. Alternatively, the controller 108 may be configured to receive the input(s) prior to performing the tillage operation. As will be described below, the controller 108 may be configured to determine the location(s) of one or more crop rows within the field relative to one or more tillage tools (e.g., the shank(s) 48) of the tillage implement 12 based on the received input(s).

In some embodiments, the received input(s) may be sensor data. As described above, one or more crop material sensor(s) 102 may be mounted on the vehicle 10 and/or the tillage implement 12, with each sensor 102 configured to capture data of a section of the field across within the vehicle/implement 10/12 is traveling. In such an embodiment, as the vehicle/implement 10/12 travels across the field to perform a tillage operation thereon, the controller 108 may be configured to receive the data captured by the crop material sensor(s) 102 via the communicative link 114.

Additionally, in such embodiments, the controller 108 may be configured identify the location(s) of one or more crop rows within the field based on the received sensor data. During a harvesting operation, a harvester (not shown) may sever the stalks of the crops present within the field, leaving behind unprocessed crop material elements, such as stubble and/or root balls, at the location(s) of the crop row(s). As such, each unprocessed crop material element may generally be evenly spaced apart from each other and aligned in a row(s) in the same manner as the crops being harvested. Conversely, processed crop material elements, such as chopped up leaves and/or stalks, may be randomly dispersed about the field, including at locations where the crop row(s) were not present. In this respect, the controller 108 may be configured to process/analyze the received sensor data to identify aligned and evenly spaced apart crop material elements, such as stubble, root balls, and/or other unprocessed crop materials, present within the field. As such, the presence of aligned and evenly spaced apart crop material elements may, in turn, be indicative of the location(s) of a crop row(s) within the field. In this respect, by identifying the aligned and evenly spaced apart crop material elements, namely the unprocessed crop materials, as opposed to the randomly dispersed crop material elements, namely the processed crop materials, the controller 108 may be able to identify the location(s) of the crop row(s) within the field after the crops have been harvested. For instance, the controller 108 may include one or more algorithms stored within its memory device(s) 112 that, when executed by the processor(s) 110, allow the controller 108 to identify aligned and evenly spaced apart crop material elements within the field based on the received sensor data.

Figure 4:
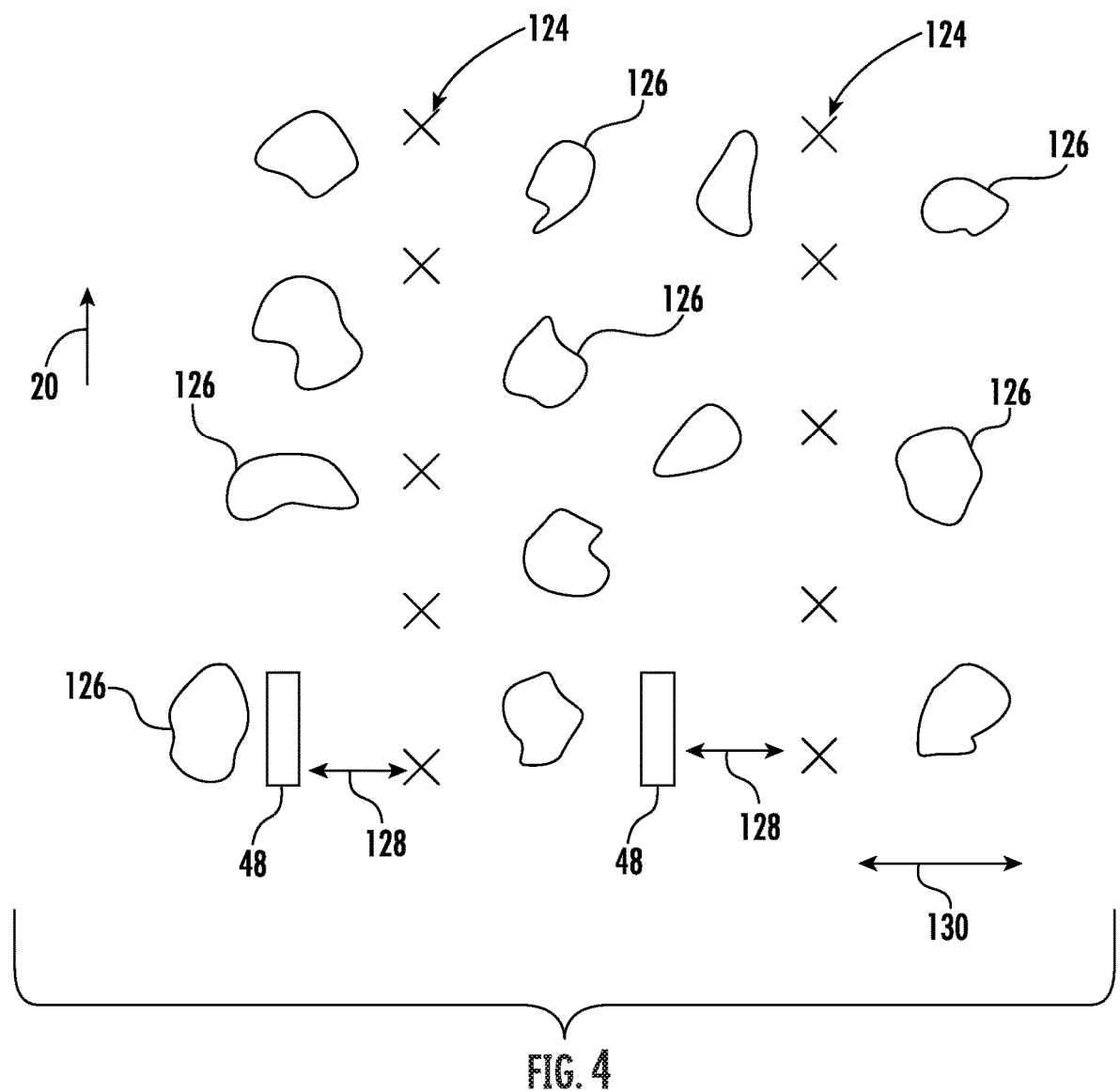
FIG. 4 illustrates an example diagrammatic view of a portion of a field across which a tillage implement is traveling, particularly illustrating the lateral distances between a plurality of tillage tools of the tillage implement and a plurality of crop rows within the field.

For example, FIG. 4 illustrates an example diagrammatic view of a portion of the field across which the vehicle/implement 10/12 is traveling. In the illustrated portion of the field, each unprocessed crop material element (e.g., stubble and/or root balls) is illustrated by an "X." As shown, the unprocessed crop material elements are generally aligned in two crop rows 124. Furthermore, the unprocessed crop material elements are generally evenly spaced apart from each other within each crop row 124. Moreover, a plurality of processed crop material elements 126, such as chopped up leaves and/or stalks, are randomly dispersed about the illustrated portion of the field. In this respect, the controller 108 may be configured to process/analyze the data received from the crop material sensor(s) 102 to identify locations of the crop rows 124 based on the presence of the aligned and evenly spaced apart crop material elements (i.e., the unprocessed crop material elements). As such, the controller 108 may be configured to generally filter out or otherwise ignore the processed crop material elements 126 present within the field.

Referring again to FIG. 3, in one embodiment, the controller 108 may be configured to generate a field map(s) illustrating the locations of the identified crop row(s) within the field. More specifically, the controller 108 may be configured to geo-locate the position of the tillage implement 12 based on data received from the location sensor 104. For example, the controller 108 may associate each identified crop row with the position in the field where the identification was made. Thereafter, the controller 108 may be configured to generate one or more field maps (e.g., a graphical field map(s)) illustrating the locations of the crop rows within the field. For instance, the controller 108 may be configured to execute one or more algorithms stored within its memory 112 that generate the field map(s) based on the identified crop rows and the data received from the location sensor 104 (e.g., via the communicative link 114).

Alternatively, the input(s) associated with the crop material present within the field may correspond to a field map(s) providing the location(s) of one or more crop rows within the field. In general, such field map(s) may be generated during a previous agricultural operation, such as a planting operation. More specifically, the field map(s) may be stored within the memory device(s) 120 of the remote database server 116. In one embodiment, the field map(s) may be transmitted to the controller 108 (e.g., via the communicative link 122) and stored within its memory device(s) 112 prior to the start of the tillage operation. In another embodiment, the controller 108 may access the field map(s) stored in the remote database server 116 (e.g., via the communicative link 122) during the tillage operation. In this regard, as the implement/vehicle 10/12 travels across the field, the controller 108 may be configured to geo-locate the implement/vehicle 10/12 within the field based on the data (e.g., coordinates) received from the location sensor 104 (e.g., via the communicative link 114). Thereafter, the controller 108 may be configured to access the field map(s) stored within its memory device(s) 112 and/or request such field map(s) from the remote database server 116 to identify the location(s) of the crop row(s) adjacent to the tillage implement 12. However, in alternative embodiments, the controller 108 may be configured to receive any other suitable input(s) associated with the crop material from any other suitable device(s).

In several embodiments, the controller 108 may be configured to determine the location(s) of the crop rows relative to one or more tillage tools of the tillage implement 12. In general, as the vehicle/implement 10/12 travels across the field to perform the tillage operation thereon, it may be desirable that one or more tillage tools (e.g., the shank(s) 48) of the tillage implement 12 engage the stubble, root balls, and/or other unprocessed crop materials. Such engagement by the tillage tool(s) may, in turn, cut/break up and/or dislodge the unprocessed crop materials to prepare the field for a subsequent planting operation. As described, the controller 108 may be configured to identify the location(s) of one or more crop rows within the field as described above (e.g., based on data received from the sensor(s) 102 and/or a field map(s)). Thereafter, in several embodiments, the controller 108 may be configured to determine the positioning of the tillage tool(s) relative to identified crop row(s).

In some embodiments, the controller 108 may be configured to determine the lateral distance(s) between the tillage tool(s) and the identified crop row(s). In certain instances, farmers may perform tillage operations such that the direction of travel 20 of the vehicle/implement 10/12 is generally in the same direction as the crop rows. In such instances, when the tillage tool(s) (e.g., the shank(s) 48) of the tillage implement 12 are laterally spaced apart from the crop row(s), the tool(s) may not cut/break up and/or dislodge the unprocessed crop materials (e.g., the stubble and/or the root balls) present at the location(s) of the crop row(s). As such, the controller 108 may be configured to determine the lateral distance(s) between the tillage tool(s) and the identified crop row(s) based on the received data from the crop material sensor(s) 102 and/or the field map(s). For example, as shown in FIG. 4, in one embodiment, the controller 108 may be configured to determine a distance (e.g., as indicated by arrow 128 in FIG. 4) in a lateral direction (e.g., as indicated by arrow 130 in FIG. 4) between the shanks 48 and the identified crop rows 124, with the lateral direction 130 extending perpendicular relative to the direction of travel 20 of the vehicle/implement 10/12.

Figure 5:
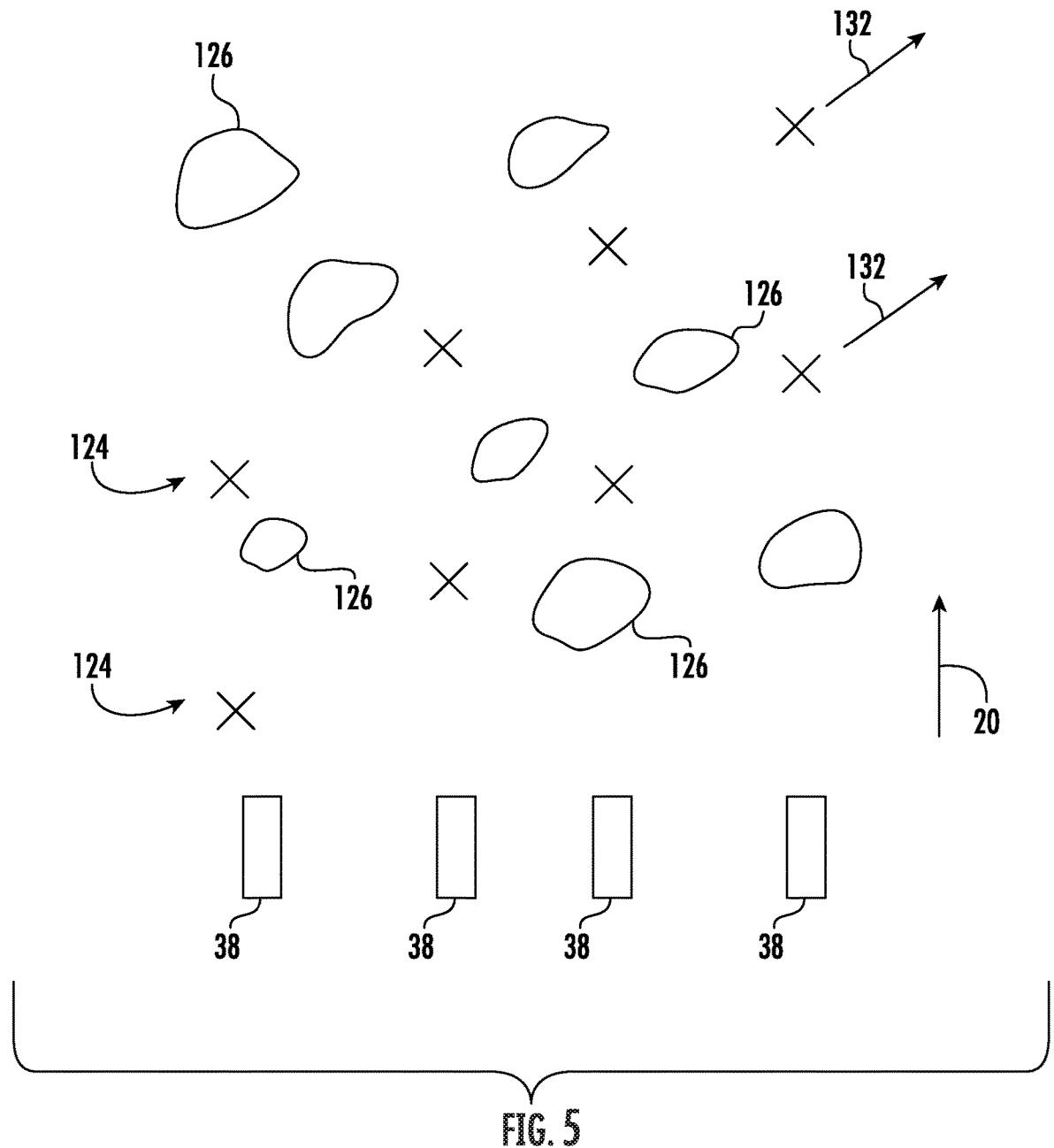
FIG. 5 illustrates another example diagrammatic view of a portion of a field across which a tillage implement is traveling, particularly illustrating the angular orientation of a plurality of tillage tools of the tillage implement and a plurality of crop rows within the field.

Furthermore, in other embodiments, the controller 108 may be configured to determine the angle(s) of the crop row(s) relative to the direction of travel 20 of the tillage implement 12. In other instances, farmers may perform tillage operations such that the direction of travel 20 of the vehicle/implement 10/12 is generally at a specific oblique angle (or range of oblique angles) relative to the direction as the crop rows. In such instances, when the direction of travel 20 is offset from the specific oblique angle (or range of oblique angles), the tillage tool(s) may not cut/break up and/or dislodge the unprocessed crop materials (e.g., the stubble and/or the root balls) present at the location(s) of the crop row(s). As such, the controller 108 may be configured to determine the angle(s) of the crop row(s) relative to the direction of travel 20 of the vehicle/implement 10/12 based on the received data from the crop material sensor(s) 102 and/or the field map(s). For example, as shown in FIG. 5, in one embodiment, the controller 108 may be configured to determine the angle(s) between the direction of travel 20 of the vehicle/implement 10/12 and the direction (e.g., as indicated by arrows 132 in FIG. 5) in which the crop rows 124 extend.

Referring again to FIG. 3, in accordance with aspects of the present subject matter, the controller 108 may be configured to control the direction of travel 20 of the tillage implement 120 based on the determined location(s) of the crop row(s) relative to the tillage tool(s). Specifically, in one embodiment, when the determined lateral distance(s) exceeds a predetermined maximum lateral distance value (thereby indicating that the tillage tool(s) are not engaging the unprocessed crop material within the field), the controller 108 may initiate an adjustment to the direction of travel 20 of the vehicle/implement 10/12. For example, the controller 108 may transmit instructions to the steering device(s) 106 of the vehicle 10 (e.g., via the communicative link 114). Such instructions may, in turn, instruct the steering device(s) 106 to adjust the direction of travel 20 of the vehicle/implement 10/12 in a manner that reduces the lateral distance between the tillage tool(s) and the crop row(s). In another embodiment, when the determined angle(s) between the tillage tool(s) and the identified crop row(s) falls outside of a predetermined angle range (thereby indicating that the tillage tools are not engaging the unprocessed crop material within the field), the controller 108 may initiate an adjustment to the direction of travel 20 of the vehicle/implement 10/12. For example, the controller 108 may transmit instructions to the steering device(s) 106 of the vehicle 10 (e.g., via the communicative link 114). Such instructions may, in turn, instruct the steering device(s) 106 to adjust the direction of travel 20 of the vehicle/implement 10/12 in a manner that adjusts the angle between direction of travel 20 and the crop row(s).

Figure 6:
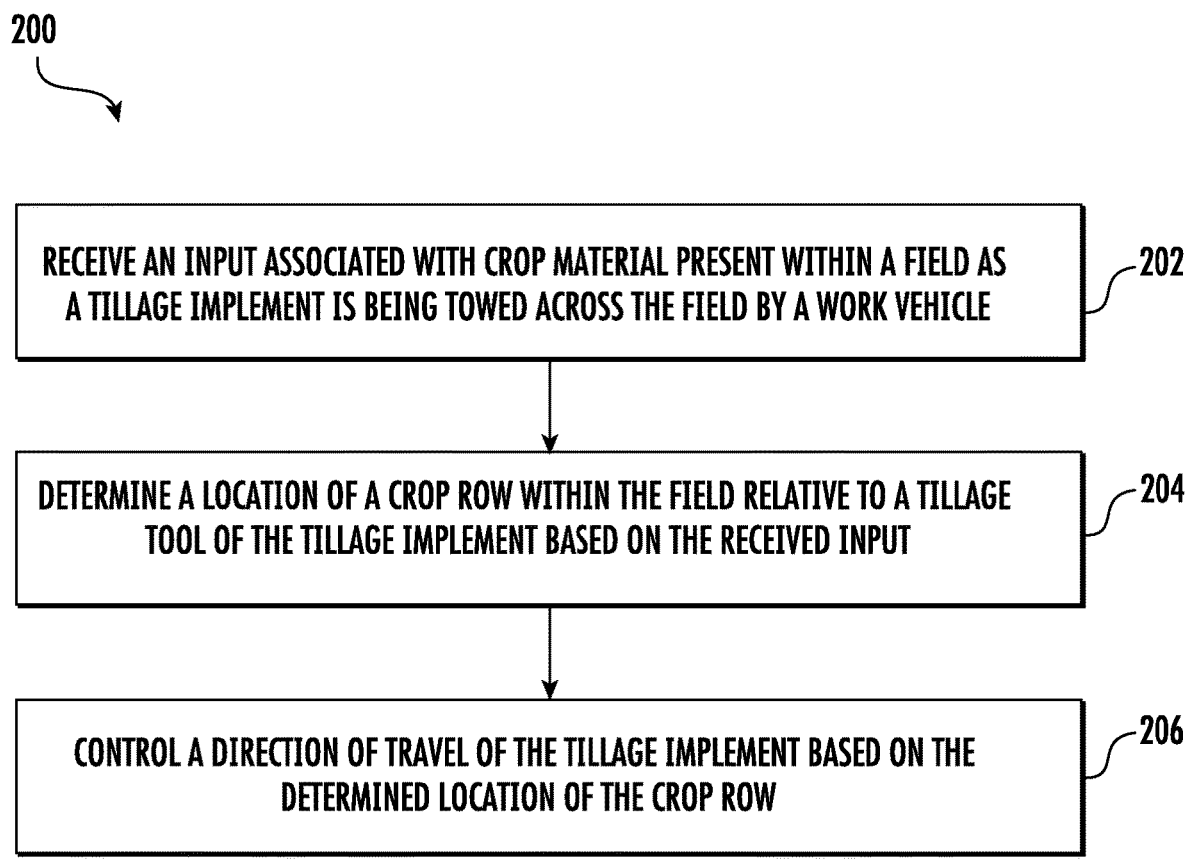
FIG. 6 illustrates a flow diagram of one embodiment of a method for controlling the operation of a tillage implement in accordance with aspects of the present subject matter.

Referring now to FIG. 6, a flow diagram of one embodiment of a method 200 for controlling the operation of a tillage implement is illustrated in accordance with aspects of the present subject matter. In general, the method 200 will be described herein with reference to the work vehicle 10, the tillage implement 12, and the system 100 described above with reference to FIGS. 1-5. However, it should be appreciated by those of ordinary skill in the art that the disclosed method 200 may generally be implemented with any work vehicle having any suitable vehicle configuration, with any tillage implement having any suitable implement configuration, and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving, with one or more computing devices, an input associated with crop material present within a field as a tillage implement is being towed across the field by a work vehicle. For instance, as described above, the controller 108 may be configured to receive one or more inputs associated with crop material present within a field from the crop material sensor(s) 102 and/or the remote database server 116 as a tillage implement 12 is being towed across the field by the work vehicle 10.

Additionally, at (204), the method 200 may include determining, with the one or more computing devices, a location of a crop row within the field relative to a tillage tool of the tillage implement based on the received input. For instance, as described above, the controller 108 may be configured to determine the location(s) of one or more crop rows within the field relative to one or more tillage tools (e.g., the shank(s) 48) of the tillage implement 12 based on the received input(s).

Moreover, as shown in FIG. 6, at (206), the method 200 may include controlling, with the one or more computing devices, a direction of travel of the tillage implement based on the determined location of the crop row. For instance, as described above, the controller 108 may be configured to control the direction of travel 20 of the tillage implement 12 based on the determined location(s) of the crop row(s), such as by controlling the operation of the steering device(s) 106 of the vehicle 10.

It is to be understood that the steps of the method 200 are performed by the controller 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 108 described herein, such as the method 200, is implemented in software code or instructions which are tangibly stored on a tangible computer readable medium. The controller 108 loads the software code or instructions via a direct interface with the computer readable medium or via a wired and/or wireless network. Upon loading and executing such software code or instructions by the controller 108, the controller 108 may perform any of the functionality of the controller 108 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling an operation of a tillage implement being towed across a field by a work vehicle, the system comprising:
 a tillage tool configured to engage soil and crop material present within a field as the tillage implement is being towed across the field by the work vehicle; and
 a controller configured to:
  receive an input associated with crop material present within the field;
  determine a location of a crop row relative to the tillage tool based on the received input; and
  control a direction of travel of the tillage implement based on the determined location of the crop row relative to the tillage tool.

2. The system of claim 1, wherein, when determining the location of crop row relative to the tillage tool, the controller is configured to determine a lateral distance between the crop row and the tillage tool, the controller further configured to initiate an adjustment to the direction of travel of the tillage implement when the determined lateral distance exceeds a predetermined maximum lateral distance value.

3. The system of claim 1, wherein, when determining the location of crop row relative to the tillage tool, the controller is configured to determine an angle of the crop row relative to the direction of travel of the tillage implement, the controller further configured to initiate an adjustment to the direction of travel of the tillage implement when the determined angle falls outside of a predetermined angle range.

4. The system of claim 1, further comprising:
a sensor provided in operative association with one of the work vehicle or the tillage implement, the sensor configured to capture data indicative of the crop material present within the field, the sensor being communicatively coupled to the controller, wherein the input comprises data received from the sensor.

5. The system of claim 4, wherein, when determining the location of crop row relative to the tillage tool, the controller is configured to identify aligned and spaced apart crop material elements present within the field, the aligned and spaced apart crop material elements being indicative of the crop row.

6. The system of claim 4, wherein the sensor comprises a light detection and ranging (LIDAR) sensor.

7. The system of claim 4, wherein the sensor is positioned at an aft end of the tillage implement such that the sensor is configured to capture data indicative of the crop material present within the field aft of the tillage implement.

8. The system of claim 1, wherein the input comprises a field map generated during a previous agricultural operation.

9. The system of claim 1, wherein the controller is further configured to generate a field map based on the determined location of the crop row.

10. The system of claim 1, wherein the crop material comprises at least of root balls or stubble.

11. The system of claim 1, wherein the tillage tool comprises a shank.

12. The system of claim 1, further comprising:
a frame of the tillage implement, the tillage tool being supported on the frame.

13. A method for controlling an operation of a tillage implement, the tillage implement including a tillage tool configured to engage soil and crop material present within a field as the tillage implement is being towed across the field by a work vehicle, the method comprising:
receiving, with one or more computing devices, an input associated with crop material present within the field;
determining, with the one or more computing devices, a location of a crop row within the field relative to the tillage tool based on the received input;
controlling, with the one or more computing devices, a direction of travel of the tillage implement based on the determined location of the crop row relative to the tillage tool.

14. The method of claim 13, wherein:
determining the location of crop relative to the tillage tool comprises determining, with the one or more computing devices, a lateral distance between the determined crop row and the tillage tool; and
controlling the direction of travel of the tillage implement comprises initiating, with the one or more computing devices, an adjustment to the direction of travel of the tillage implement when the determined lateral distance exceeds a predetermined maximum lateral distance value.

15. The method of claim 13, wherein:
determining the location of crop relative to the tillage tool comprises determining, with the one or more computing devices, an angle of the crop row relative to the direction of travel of the tillage implement; and
controlling the direction of travel of the tillage implement comprises initiating, with the one or more computing devices, an adjustment to the direction of travel of the tillage implement when the determined angle falls outside of a predetermined angle range.

16. The method of claim 13, wherein receiving the input associated with the location of the crop row comprises receiving, with one or more computing devices, sensor data indicative of the crop material present within the field.

17. The method of claim 13, wherein determining the location of crop relative to the tillage tool comprises identifying, with the one or more computing devices, aligned and spaced apart crop material elements present within the field, the aligned and spaced apart crop material elements being indicative of the crop row.

18. The method of claim 13, wherein receiving the input associated with the location of the crop row comprises receiving, with one or more computing devices, a field map generated during a previous agricultural operation.

19. The method of claim 13, further comprising:
generating, with the one or more computing devices, a field map based on the determined location of the crop row.

20. The method of claim 13, wherein the crop material comprises at least of root balls or stubble.

* * * * *